Figure 1:
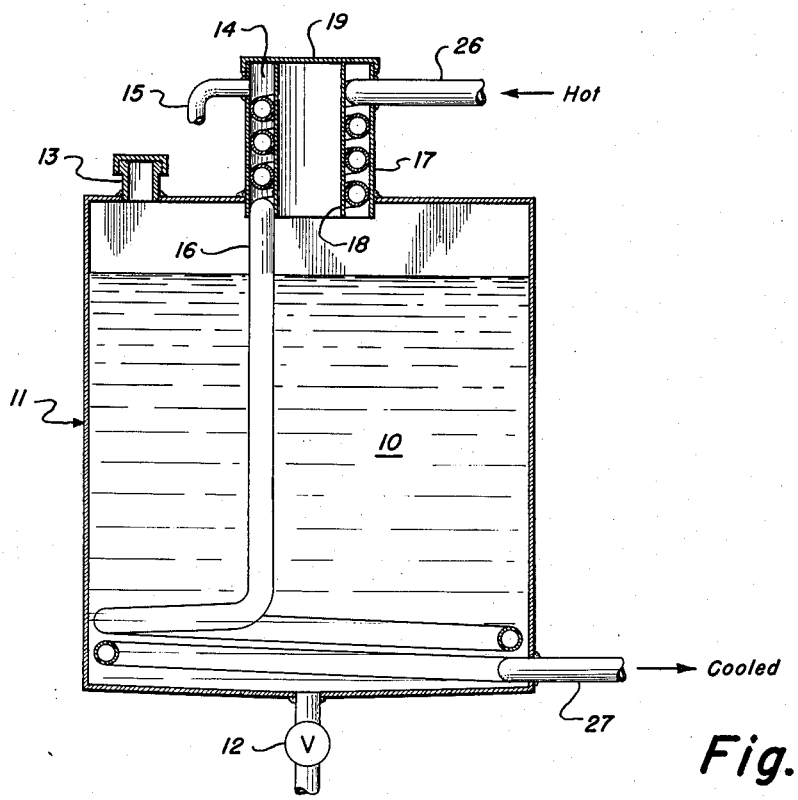

Jan. 10, 1961  J. A. SOUTHWICK  2,967,517
COOLING SYSTEM FOR ENGINES
Filed Feb. 4, 1960

INVENTOR:
John A. Southwick
BY
Edward L. Amonette
AGENT

United States Patent Office 2,967,517
Patented Jan. 10, 1961

2,967,517

COOLING SYSTEM FOR ENGINES

John A. Southwick, 1213 Georgia NE.,
Albuquerque, N. Mex.

Filed Feb. 4, 1960, Ser. No. 6,659

10 Claims. (Cl. 123—41.55)

This invention relates to cooling systems for engines and more especially it relates to those systems employing circulating liquid coolants which vaporize when the engines become overheated.

Such vaporization or "boiling" as it is usually called, is undesirable for several reasons, one of which being that the engine usually is not designed to operate at such an elevated temperature. When it does, portions of the fuel system are apt to become overheated, resulting in vaporization of fuel and consequent stalling of the engine. In the modern automobile the cooling system is usually designed to be adequate for most driving conditions. However, as the automobile grows older, and particularly if it is not maintained properly, sludge and scale will develop in the cooling system thus reducing its efficiency. It is quite expensive to dislodge the accumulated rust and scale by removing the radiator and "rodding out" the tubes which carry the hot coolant through the radiator. Chemical cleaning provides a temporary cure but it is not as effective as the removal and overhaul of the cooling system.

Also, there are certain severe driving conditions which are not allowed for in the original design of the cooling system. Under these conditions even a new automobile with a cooling system which is in good condition will overheat. Obviously in this situation it will do no good to clean out the radiator and cooling system since there is no sludge and rust or scale present. What is needed is greater system capacity.

It is an object of my invention to provide a secondary cooling system which is easily installed on old or new engines and which automatically increases the cooling capacity of the primary cooling system when needed. In between periods of need the secondary system requires little or no maintenance and is virtually trouble free. In addition when water is used as a coolant in the secondary cooling system, vented water vapor from the system can be used in a vapor injection system which will improve the efficiency of an internal combustion engine. The efficiency of my invention is not appreciably affected by changes in altitude.

Briefly, the secondary cooling system which I have invented employs the principle of removing the latent heat of vaporization of a coolant in the secondary system from the hot coolant of the primary system, thus cooling the primary system and preventing its vaporization. This is done by choice of pressures and types of coolants so that the secondary coolant will vaporize at a temperature below that at which the primary coolant will vaporize. Through the medium of a heat exchanger the primary coolant gives its heat to the secondary coolant, causing the secondary coolant to vaporize and prevent boiling of the primary coolant.

Figure 2:
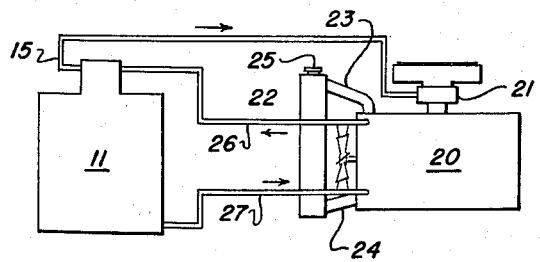

A more complete understanding of my invention may be had by reading the description to follow in conjunction with the attached drawing in which:

Fig. 1 is a detailed sectional view of a preferred embodiment of my invention; and Fig. 2 is a general view of an optional connection of the preferred embodiment to a typical internal combustion engine.

Referring now to Fig. 1, coolant 10 which in this case is a fluid, is held by container 11. Drain 12 allows for the removal of the coolant which was initially supplied through fill spout 13. The volume above the coolant is vented through annular space 14 and out vent 15. The annular space is seen to spiral upward between adjacent coils of tubing 16 which fits tightly between the walls of cylinders 17 and 18. Cap 19 seals the annular space. The tubing enters container 11 at 26, spirals between the two cylinders, and passes through the remainder of the container and the fluid coolant in a spiral or other form designed to give maximum contact between the coolant and the outer surface of the tubing. The tubing leaves the bottom portion of container 11 through a fluid-tight closure at 27.

Fig. 2 shows one possible way of connecting this preferred embodiment to a typical internal combustion engine. The engine is shown as having a block 20, carburetor 21 and radiator 22. Fluid coolant for the engine is transported from the block to the upper portion of the radiator by hose 23 and, when cooled, from the lower portion of the radiator back to the block by hose 24. Connections are made to the secondary cooling system from both the hot and cold portions of the primary cooling system as shown. The tubing entering the top portion of container 11 at 26 is connected to the hot portion of the primary system, while the tubing returns from the lower portion of the container at 27 to a cooler portion of the primary system. Thus the primary coolant circulates downward through the coiled tubing in the upper portion of container 11 then through the tubing immersed in the secondary coolant 10.

Assume for the moment that the primary cooling system is of the modern pressurized type, pressurization being accomplished by means of radiator cap 25. The cap may have within it a spring which allows a certain amount of pressure above atmospheric pressure to build up inside the primary cooling system due to expansion of the coolant as it is heated by engine operation and sometimes due to the vaporization of the coolant. The purpose of the pressurization is to raise the vaporization temperature of the primary coolant so that the engine can run hotter before vaporization occurs. This allows operation under more severe conditions than would be possible without pressurization, without loss of coolant through vaporization.

If the primary and secondary coolants are both water, the secondary cooling action proceeds as follows: Assuming operation under an adverse condition which causes the temperature of the primary coolant to rise toward a vaporization temperature, the primary meanwhile circulating through tubing 16 and exchanging some of its heat with secondary coolant 10, eventually a temperature will be reached at which secondary coolant 10 will vaporize. This vaporization temperature is dependent upon the pressure at which secondary coolant 10 is maintained. If vent 15 is opened to the atmosphere, secondary coolant 10 will vaporize at a temperature lower than that at which primary coolant will vaporize. When vaporization of secondary coolant 10 occurs, a very large amount of heat (latent heat of vaporization of the secondary coolant) is taken from the primary coolant, thus lowering its temperature and preventing its eventual vaporization. The vaporized secondary coolant then proceeds upward through annular space 14 spiralling between the turns of tubing 16. Under conditions of extreme overheating the secondary coolant will boil vigorously, splashing the coolant over the upper turns of tubing 16. Since the tubing is very hot where it enters container 11, vaporization of coolant 10 will occur upon contact, thus cooling the primary coolant immediately on its entrance into the container and reducing the amount of boiling of the secondary coolant. Since tubing 16 is fitted tightly between cylinders 17 and 18, secondary coolant 10 is prevented from splashing out through vent 15.

It is seen that a number of variations of conditions will provide variations in the spread between the vaporization temperatures of the primary and secondary coolants, thus giving control over the degree of protection afforded. For instance, if the primary coolant has a high proportion of ethylene glycol, or other chemical which has a higher temperature of vaporization than does the water in the secondary system, the spread between the two vaporization temperatures is increased and a greater amount of heating of the primary coolant can be tolerated before it boils. Or, the degree of protection can be reduced by pressurization of secondary coolant 10 by means of a pressurized cap on steam vent 15. This will cut down the loss of secondary coolant through vaporization. The same result may be accomplished by addition of ethylene glycol or other chemicals to raise the vaporization temperature of the secondary coolant.

If, on the other hand, it is desirable that the secondary coolant tend to vaporize at a lower temperature, vent 15 may be connected to a source of vacuum. This will cause the secondary coolant to boil at a lower temperature, or earlier in the condition of increasing temperature of the primary coolant. For convenience, vent 15 may be connected directly into carburetor 21 of an internal combustion engine as a vacuum source. In this instance the benefits of vapor injection to the engine are also realized. Connection of the vent to a source of vacuum also is advantageous in case the primary cooling system is not pressurized or does not have its vaporization temperature raised above that of the secondary coolant by other means. For instance, an older cooling system which does not have pressurization may be operated with water as a coolant, while the secondary system also has water as a coolant and has the vent connected to a vacuum source. The result will be a lowering of the boiling point of the secondary coolant below that of the primary coolant with the resultant increased cooling action described above.

Instead of connecting the secondary system in parallel with the radiator 22 of a primary system, as in Fig. 2, it may be connected in series, with the tubing joined at 26 to a hot portion of the engine block 20, and joined at 27 to the radiator inlet; the secondary system replacing hose 23. Or the secondary system can similarly replace hose 24; the tubing joining the radiator outlet at 26 and joining the cooler portion of block 20 at 27. Under certain operating conditions the radiator may be replaced entirely by the secondary system; hose 23 joining the tubing at 26, and hose 24 joining it at 27.

It will be noted that my system is unaffected by changes in altitude, since such changes will equally affect the primary and the secondary cooling systems. Also, it will be noted further that although I have described a preferred embodiment of my invention as used in relation to an internal combustion type engine having a circulating fluid cooling system, the invention may be used with other types of cooling systems wherein it is desirable to prevent a change of state of the coolant, whether the coolant originally be fluid or solid. Also, the secondary coolant may be in a solidified state changeable to a fluid or vaporized state upon receipt of heat from the primary coolant. In all cases, the principle of the invention remains unchanged, i.e., the use of the change of state of the secondary coolant to absorb the latent heat of vaporization from the primary coolant and thus prevent its change of state. Other variations from the preferred embodiment will occur to those skilled in the art and may be practiced without departing from the sphere and scope of my invention as described in the claims below.

I claim as my invention:

1. A secondary cooling system for an engine having a primary cooling system with a primary coolant, comprising: a secondary coolant characteristically changing state within the secondary system at a lower temperature than that at which the primary coolant changes state within the primary system; means for containing the secondary coolant and preventing commingling of the primary and the secondary coolants; and means for transferring heat from the primary coolant to the secondary coolant.

2. A secondary system for an engine having a primary cooling system with a liquid primary coolant, comprising: a liquid secondary coolant characteristically vaporizing within the secondary system at a lower temperature than that at which the primary coolant vaporizes within the primary system; means for containing the secondary coolant and preventing commingling of the primary and the secondary coolants; and means for transferring heat from the primary coolant to the secondary coolant.

3. A secondary cooling system for an engine having a primary cooling system with a pressurized liquid primary coolant, comprising: a liquid secondary coolant having a vaporization temperature at a secondary system pressure lower than the vaporization temperature of the primary coolant at the primary system pressure; means for containing the secondary coolant at the secondary system pressure and preventing commingling of the primary and the secondary coolants; and means for transferring heat from the primary coolant to the secondary coolant.

4. A secondary cooling system as in claim 3, wherein the secondary system pressure is atmospheric pressure.

5. A secondary cooling system as in claim 3, wherein the secondary system pressure is below atmospheric pressure.

6. A secondary cooling system for an engine having a primary cooling system with a pressurized liquid primary coolant, comprising: a liquid secondary coolant having a vaporization temperature at atmospheric pressure lower than the vaporization temperature of the primary coolant at the primary system pressure; a container for the secondary coolant which prevents commingling of the primary and the secondary coolants; tubing connected from a hot portion of the primary cooling system to a cooler portion thereof, carrying the primary coolant through the secondary coolant; and means for venting the secondary coolant to the atmosphere.

7. A secondary cooling system as in claim 6, wherein an upper portion of the container comprises: a pair of coaxial cylinders, the annular space between them being equal to the outer diameter of the tubing; and a cap which seals the upper ends of both cylinders; and wherein the tubing enters the container near the cap, spiralling downward between the pair of cylinders without adjacent turns touching one another, and leaving the container near its bottom, the bottom portion being connected to the cooler portion of the primary cooling system; said venting means being in the upper portion of the container, connected to said annular space.

8. A secondary cooling system for an internal combustion engine having a primary pressurized water cooling system, comprising: a container of water; tubing connected from a hot portion of the primary cooling system to a cooler portion thereof, carrying the water of the primary cooling system through the water of the secondary cooling system; and means for venting the secondary cooling system into the fuel intake system of the engine.

9. A secondary cooling system for an engine having a primary cooling system with a primary coolant, comprising: a secondary coolant having a vaporization temperature lower than that of the primary coolant when both coolants are at the same pressure; means for containing the secondary coolant at the same pressure as the primary coolant; and means for transferring heat from the primary coolant to the secondary coolant.

10. A secondary cooling system as in claim 9 wherein both coolants are maintained at atmospheric pressure.

References Cited in the file of this patent

UNITED STATES PATENTS 2,321,882   Wallace _____ June 15, 1943